(12) United States Patent
Ioffe et al.

(10) Patent No.:  US 12,641,627 B2
(45) Date of Patent:       May 26, 2026

(54) SYSTEMS AND METHODS FOR BROADCAST SIGNAL UTILIZATION TO IMPROVE MOBILE BROADBAND SERVICES

(71) Applicant: Apple Inc., Cupertino, CA (US)

(72) Inventors: Anatoliy S Ioffe, Sunnyvale, CA (US); Ioannis Sarkas, San Carlos, CA (US); Alexander Sayenko, Munich (DE); Sharad Sambhwani, San Diego, CA (US)

(73) Assignee: Apple Inc., Cupertino, CA (US)

( * ) Notice: Subject to any disclaimer, the term of this patent is extended or adjusted under 35 U.S.C. 154(b) by 368 days.

(21) Appl. No.: 18/229,949

(22) Filed: Aug. 3, 2023

(65) Prior Publication Data

US 2025/0048399 A1      Feb. 6, 2025

(51) Int. Cl.
| | |
|---|---|
| *H04W 72/30* | (2023.01) |
| *H04W 52/32* | (2009.01) |
| *H04W 76/50* | (2018.01) |

(52) U.S. Cl.
CPC ........... *H04W 72/30* (2023.01); *H04W 52/32* (2013.01); *H04W 76/50* (2018.02)

(58) Field of Classification Search
CPC ..... H04W 72/30; H04W 52/32; H04W 76/50; H04W 76/40; H04W 76/27; H04W 4/06; H04W 4/90; H04W 8/24
See application file for complete search history.

(56) References Cited

U.S. PATENT DOCUMENTS

| | | | | |
|---|---|---|---|---|
| 12,389,300 B2 * | 8/2025 | Catovic | ................. | H04W 60/04 |
| 2017/0339606 A1 * | 11/2017 | Kim | ...................... | H04W 36/22 |
| 2020/0022041 A1 | 1/2020 | Ly et al. | | |
| 2020/0112883 A1 * | 4/2020 | Naik | ..................... | H04W 36/22 |
| 2022/0338159 A1 * | 10/2022 | Phuyal | .................. | H04W 24/10 |
| 2022/0353734 A1 * | 11/2022 | Phuyal | .................. | H04W 76/40 |
| 2024/0056925 A1 * | 2/2024 | Maaref | ............. | H04W 36/0022 |
| 2025/0168925 A1 * | 5/2025 | Gupta | ................... | H04W 76/27 |

OTHER PUBLICATIONS

Extended European Search Report for European Patent Application No. 24190095.0 dated Dec. 18, 2024; 8 pgs.

* cited by examiner

*Primary Examiner* — Robert C Scheibel
(74) *Attorney, Agent, or Firm* — FLETCHER YODER PC

(57) ABSTRACT

A broadcast service network (separate from a cellular network) includes broadcast service signal (BSS) nodes that broadcast signals to receivers of user equipment (UE). The BSS may provide broadcast service information to user equipment, such as the emergency notifications, even when the user equipment is out of range of the cellular network. Further, the broadcast service signals may provide information that improves the user equipment's search and access time for connecting to the cellular network (e.g., a cellular service station) and/or that assists the user equipment in locating a nearby region of cellular network coverage. In addition, the BSS may be wake-up signals configured to activate the receiver when the receiver is in a sleep or inactive mode. In some embodiments, the BSS may be pointer signals configured to direct the user equipment to a broadcast service channel to receive the broadcast service information.

20 Claims, 8 Drawing Sheets

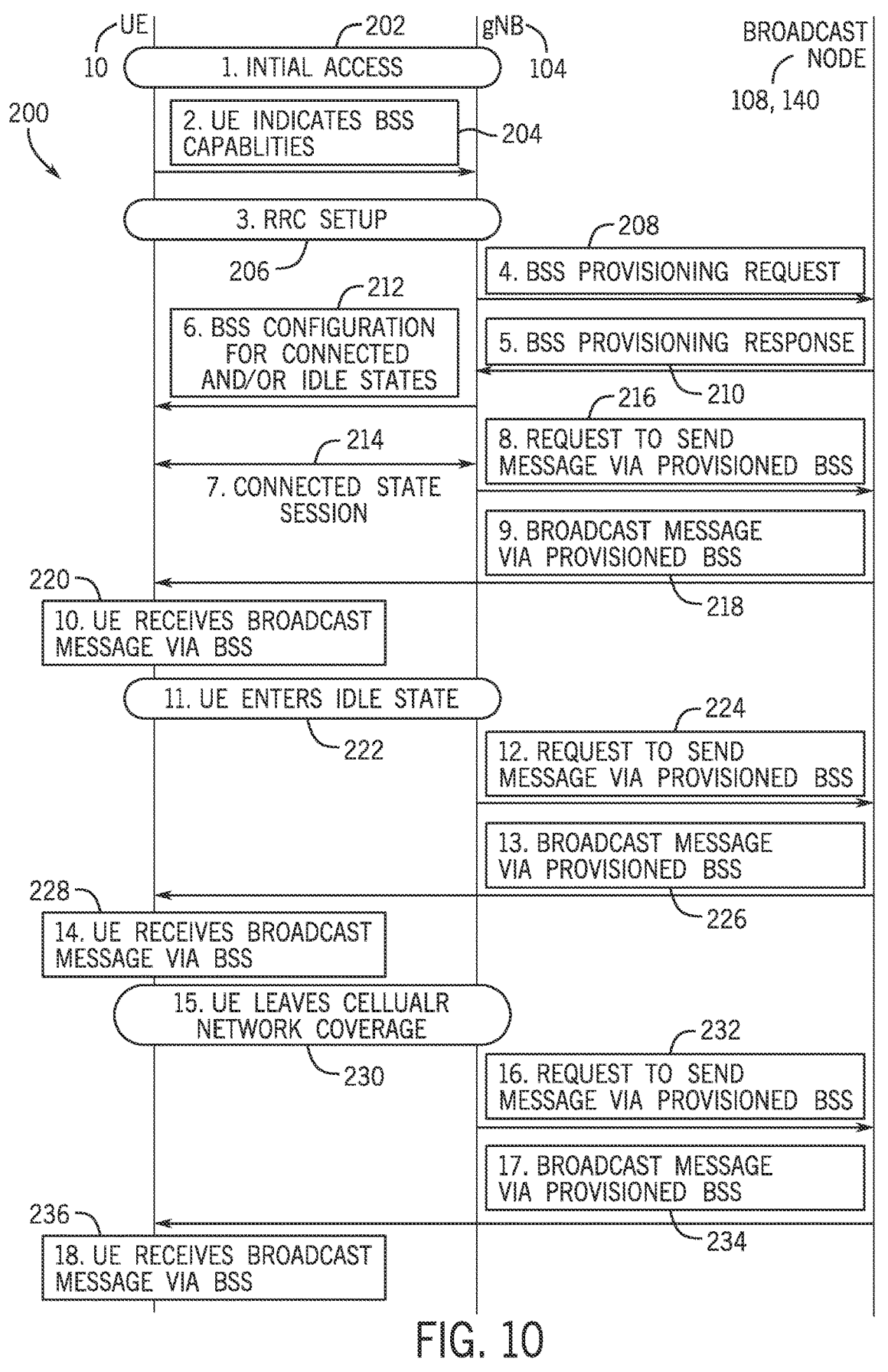

UE    202    gNB      BROADCAST
NODE 10    1. INTIAL ACCESS    104     108, 140

200

2. UE INDICATES BSS CAPABLITIES    204

3. RRC SETUP

206

4. BSS PROVISIONING REQUEST    208

6. BSS CONFIGURATION FOR CONNECTED AND/OR IDLE STATES    212

5. BSS PROVISIONING RESPONSE    210

8. REQUEST TO SEND MESSAGE VIA PROVISIONED BSS    216

214

7. CONNECTED STATE SESSION

9. BROADCAST MESSAGE VIA PROVISIONED BSS    218

220

10. UE RECEIVES BROADCAST MESSAGE VIA BSS

11. UE ENTERS IDLE STATE

222

12. REQUEST TO SEND MESSAGE VIA PROVISIONED BSS    224

13. BROADCAST MESSAGE VIA PROVISIONED BSS    226

228

14. UE RECEIVES BROADCAST MESSAGE VIA BSS

15. UE LEAVES CELLUALR NETWORK COVERAGE

230

16. REQUEST TO SEND MESSAGE VIA PROVISIONED BSS    232

17. BROADCAST MESSAGE VIA PROVISIONED BSS    234

236

18. UE RECEIVES BROADCAST MESSAGE VIA BSS

FIG. 10

SYSTEMS AND METHODS FOR BROADCAST SIGNAL UTILIZATION TO IMPROVE MOBILE BROADBAND SERVICES

BACKGROUND

The present disclosure relates generally to wireless communication, and more specifically to improving utilization of mobile broadband (MBB) network resources provided to user equipment by overcoming capacity limitations of the MBB networks.

Mobile broadband (MBB) networks (e.g., cellular networks) utilize a wireless frequency spectrum (e.g., a portion of the wireless frequency bands) to provide services to user equipment within range of and supported by MBB base stations. With the growing utilization of MBB networks to deliver content to multiple different user equipment, quality of the services provided may be limited by a cell's respective coverage area, a maximum capacity of cells of the MBB wireless frequency spectrum (e.g., wireless frequency bands) due to fixed available spectrum bandwidth, and/or spectral efficiency of wireless technology used to support the MBB network. For example, the quality of the services may be affected by a number of user equipment within a coverage area supported by the MBB network and/or a number of services utilizing the MBB network. Broadcast service networks traditionally use a portion of a wireless frequency spectrum (e.g., a portion of the wireless frequency bands) to broadcast signals, such as radio signals, analog television signals, and/or digital television signals. In addition, broadcast service networks may provide broadcast services (e.g., via the broadcasted signals) to multiple different user equipment that are within range of broadcast service transmitter stations. In particular, broadcasted signals may be at a lower frequency than cellular signals. Furthermore, the broadcasted signals may deliver the same content to the multiple different user equipment that are within range of the broadcast station. As such, user equipment may utilize less power to receive and process the BSS than may be used to receive and process the MBB signals.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, user equipment includes one or more antennas, transmitter circuitry coupled to the one or more antennas, receiver circuitry coupled to the one or more antennas, and processing circuitry communicatively coupled to the transmitter circuitry and the receiver circuitry. The processing circuitry is configured to cause the transmitter circuitry to transmit one or more broadcast service signal capabilities associated with the user equipment, cause the receiver circuitry to receive a broadcast service signal configuration based on the one or more broadcast service signal capabilities, and cause the receiver circuitry to receive one or more broadcast service signals based on the broadcast service signal configuration.

In another embodiment, a method includes receiving, at a base station, an indication of a broadcast service signal receiver from user equipment, transmitting, by the base station, a broadcast service signal receiver provisioning request based on the indication to a broadcast service network, and transmitting, by the base station, a broadcast service signal configuration to the user equipment based on the broadcast service signal receiver provisioning request. The method also includes transmitting, by the base station, a request to send broadcast service information via the broadcast service network to the user equipment.

In yet another embodiment, one or more tangible, non-transitory, machine-readable media store instructions that cause processing circuitry of a broadcast service signal node to receive a broadcast service signal provisioning request from a base station for user equipment, permit resources to the user equipment based on the broadcast service signal provisioning request, receive a request to transmit broadcast service information to the user equipment, and transmit a broadcast service signal associated with the broadcast service information to the user equipment.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

FIG. 10 is a flowchart of a method for utilizing a broadcast signal node of a broadcast service network of FIG. 6 to transmit broadcast service information to the user equipment, according to embodiments of the present disclosure.

DETAILED DESCRIPTION OF SPECIFIC EMBODIMENTS

Figure 1:
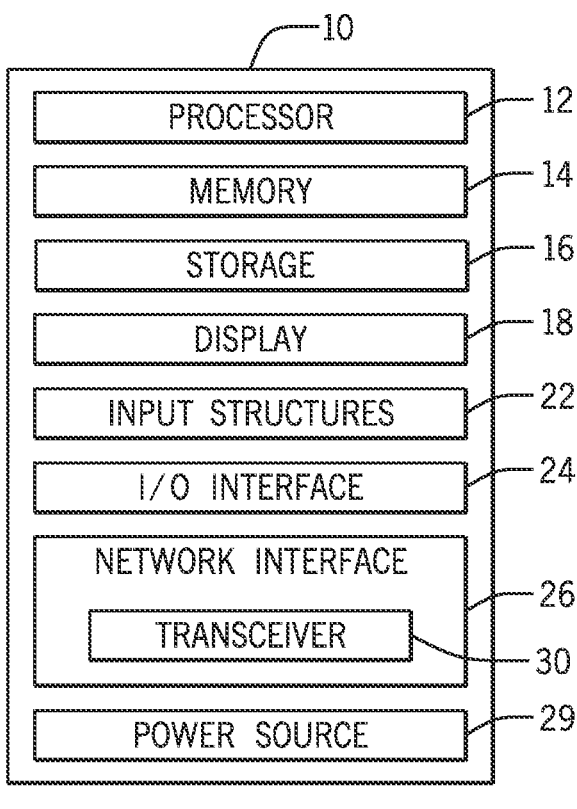
FIG. 1 is a block diagram of user equipment, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on.

As discussed herein, mobile broadband (MBB) networks (e.g., cellular wireless networks) may utilize a wireless frequency spectrum (e.g., a portion of the wireless frequency bands) to provide services to user equipment within range of and supported by a respective MBB network transmitter station. However, with the growing utilization of MBB networks to deliver content (e.g., services) to multiple different user equipment, quality of the services provided may be limited by a MBB network cell's respective coverage area, a maximum capacity of cells of the MBB wireless frequency spectrum (e.g., wireless frequency bands) due to fixed available spectrum bandwidth, and/or spectral efficiency of wireless technology used to support the MBB network. For example, the quality of the services may decrease as a number of user equipment within a coverage area supported by the MBB network increases and/or a number of services utilizing the MBB network increases. As such, a service model that efficiently improves capacity and/or quality limitations of the MBB networks is desired.

This disclosure is directed to a broadcast service model incorporated with MBB networks to provide broadcast information and/or services, such as emergency broadcast notifications, and/or MBB network control information, such as wake-up signals and/or cellular network access parameters. As discussed herein, broadcast service networks traditionally use a portion of a wireless frequency spectrum (e.g., a portion of the wireless frequency bands) to broadcast signals (e.g., broadcast service signals (BSS)), such as radio signals, analog television signals, and/or digital television signals. Furthermore, the broadcast service networks may provide broadcast services via the BSS to multiple different user equipment that are within range of a respective broadcast service transmitter station. In particular, BSS may be at a lower frequency than the wireless signals (e.g., cellular signals) used by mobile broadband networks (MBB). In addition, the BSS may be configured to deliver the same content at approximately the same time (e.g., simultaneously) to the multiple different user equipment that are within range of the broadcast station. As such, user equipment may utilize less power to receive and process the BSS than may be used to receive and process the MBB signals.

In general, the present embodiments of the broadcast service model may utilize a portion of the wireless frequency spectrum (e.g., BSS frequency range different from the portion of the wireless frequency spectrum for MBB network signals) to off-load information that may conventionally be transmitted via the MBB network, thereby increasing a capacity of the MBB network and increasing the quality of the services provided by the MBB network. In addition, information provided by the broadcast service model may enable user equipment to receive important or time-sensitive information, such as the emergency notifications, when the user equipment is out of range of the MBB network. Further, the broadcast service model may provide information that improves the user equipment's search and access time for connecting to the MBB network (e.g., MBB service station) and/or that assists the user equipment in locating a nearby region of MBB network coverage.

In addition, at least some embodiments may enable efficient power usage in user equipment. For example, user equipment may continuously or periodically activate a receiver (e.g., a receiver of a cellular modem) to ensure that wireless (e.g., cellular) signals are received. However, this continuous or periodic activation of the receiver may consume excessive power. Instead, the user equipment may utilize a broadcast service signal (BSS) receiver or low power receiver that may consume less power than the cellular receiver as it is lower in complexity (e.g., due to not having to demodulate a received signal, not having to amplify a received signal, not having to filter a received signal, or so on). If the user equipment is not actively receiving a wireless signal, or not receiving a wireless signal for a threshold period of time, the user equipment may cause the cellular receiver to enter a sleep or power-saving mode, or be deactivated (e.g., powered off), and activate the BSS receiver. The BSS receiver, which may consume less power than the cellular receiver, may then periodically scan for a wireless broadcast service signal (e.g., a wake-up signal) sent from a broadcast service network.

In some embodiments, upon receiving the broadcast service signal, the BSS receiver may activate or wake up the cellular receiver, which may begin receiving wireless signals (e.g., cellular signals having user data). The BSS receiver may then enter a sleep or power-saving mode, or be deactivated. In addition, the disclosed embodiments include a broadcast service network (e.g., separate from a cellular network) having BSS nodes that broadcast signals to receivers, such as BSS receivers, of user equipment.

The BSSs may have lower frequencies (e.g., 1 gigahertz or less, 800 megahertz (MHz) or less, within a range of 500 MHz to 680 MHz, and so on) than frequencies of cellular signals (e.g., cellular network signals). For example, the BSSs may be within a television whitespace spectrum. The user equipment may maintain two independent cell selection processes: one from the broadcast service network, and one from the cellular network. If the user equipment is configured to listen for a BSS (e.g., its BSS receiver is active), then the user equipment may monitor for or be capable of detecting a presence of the broadcast service network.

In some embodiments, the cellular network may determine that the user equipment should enter the sleep mode (e.g., due to inactivity of the cellular receiver), and the cellular network (e.g., via a Next Generation NodeB (gNodeB or gNB) base station) may request resources for the user equipment from a BSS node and activate the BSS receiver of the user equipment. In additional or alternative embodiments, when the cellular receiver of the user equipment enters an idle state (e.g., a Radio Resource Control (RRC) Idle or Inactive state), the cellular network (e.g., via the gNodeB base station) may request resources for the user equipment from the broadcast service network (e.g., via the BSS node) and activate the BSS receiver of the user equipment. It should be appreciated that in some embodiments, both the cellular receiver and the BSS receiver may be active at the same time. Furthermore, in some embodiments, the user equipment may include a single receiver that performs both functions of the BSS receiver and functions of the cellular receiver as described herein.

In the event that the cellular network has data to send to the user equipment while the user equipment is in sleep mode, a threshold time has expired, and so on, the cellular network may request a BSS from the broadcast service network (e.g., via the BSS node), which broadcasts a BSS (e.g., including a wake-up signal) that may be received by the user equipment. Similarly, if the user equipment has data (e.g., user data) to transmit to the cellular network, the user equipment may acquire a cell supported by a base station of the cellular network, and the cellular network may request that the BSS signal node stop providing resources to the user equipment, which may remove such resources. In this manner, the user equipment may cause its cellular receiver to enter a power-saving mode and activate its BSS receiver when it is not actively receiving data, ensuring that the BSS receiver activates its cellular receiver when there is data to send or receive, while saving power.

If the cellular network desires to activate the user equipment (e.g., due to presence of data that is addressed to the user equipment), the corresponding indication to the broadcast service network may be sent by different network entities depending on the state of the user equipment. For example, if the user equipment is in an inactive state (e.g., the user equipment context is in a radio access network (RAN)), the RAN may initiate the request to the broadcast service network. If the user equipment is in an idle state, then depending on the configuration, it may be either the RAN or a core network sending the corresponding request to the broadcast service network. If the core network is involved, then it may be aware that the user equipment is configured with a BSS mode (e.g., configured with BSS resources, etc.).

With the foregoing in mind, FIG. 1 is a block diagram of user equipment (UE) 10 (e.g., electronic device), according to embodiments of the present disclosure. The UE 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the UE 10.

By way of example, the UE 10 may include any suitable computing device, including a desktop or notebook computer, a portable electronic or handheld electronic device such as a wireless electronic device or smartphone, a tablet, a wearable electronic device, and other similar devices. In additional or alternative embodiments, the UE 10 may include an access point, such as a base station, a router (e.g., a wireless or Wi-Fi router), a hub, a switch, and so on. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the UE 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the UE 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, non-transitory computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the UE 10 to provide various functionalities.

In certain embodiments, the display 18 may facilitate users to view images generated on the UE 10. In some embodiments, the display 18 may include a touch screen, which may facilitate user interaction with a user interface of the UE 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the UE 10 may enable a user to interact with the UE 10 (e.g., pressing a button to increase or decrease a volume level). The I/O interface 24 may enable UE 10 to interface with various other electronic devices, as may the network interface 26. In some embodiments, the I/O interface 24 may include an I/O port for a hardwired connection for charging and/or content manipulation using a standard connector and protocol, such as the Lightning connector, a universal serial bus (USB), or other similar connector and protocol. The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN) (e.g., MBB network), such as any standards related to the Third Generation Partnership Project (3GPP), including, for example, a $3^{rd}$ generation (3G) cellular network, universal mobile telecommunication system (UMTS), $4^{th}$ generation (4G) cellular network, Long Term Evolution® (LTE) cellular network, Long Term Evolution License Assisted Access (LTE-LAA) cellular network, $5^{th}$ generation (5G) cellular network, and/or New Radio (NR) cellular network, a $6^{th}$ generation (6G) or greater than 6G cellular network, a satellite network, a non-terrestrial network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)) and/or any other cellular communication standard release (e.g., Release-16, Release-17, any future releases) that define and/or enable frequency ranges used for wireless communication. The network interface 26 of the UE 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth. The power source 29 of the UE 10 may include any suitable source of power, such as a rechargeable lithium polymer (Li-poly) battery and/or an alternating current (AC) power converter.

Figure 2:
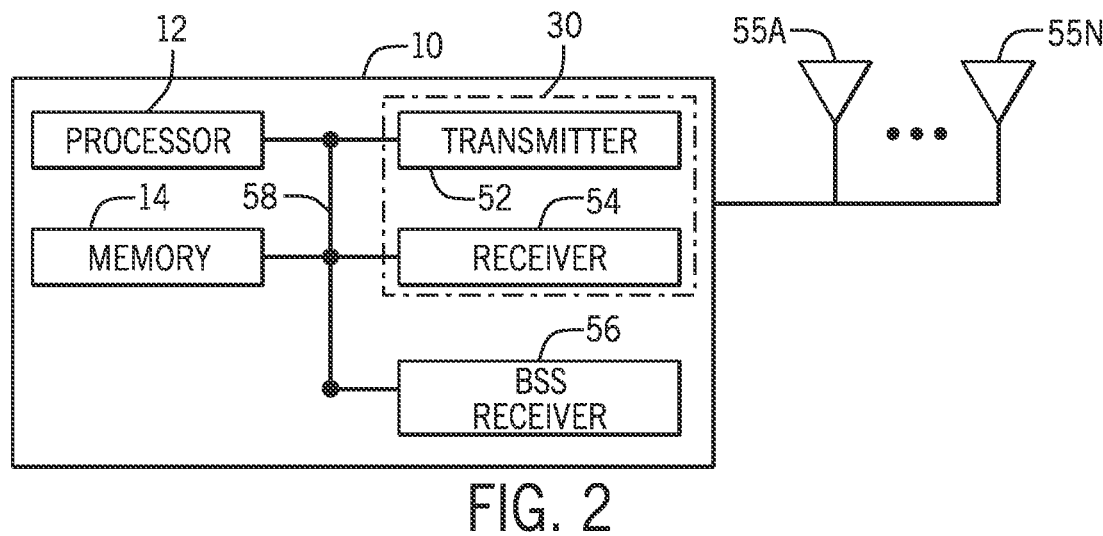
FIG. 2 is a functional diagram of the user equipment of FIG. 1, according to embodiments of the present disclosure.

FIG. 2 is a functional diagram of the UE 10 of FIG. 1, according to embodiments of the present disclosure. As illustrated, the processor 12, the memory 14, the transceiver 30, a transmitter 52, a receiver 54, a broadcast service signal (BSS) receiver 56, and/or antennas 55 (illustrated as 55A-55N, collectively referred to as an antenna 55) may be communicatively coupled directly or indirectly (e.g., through or via another component, a communication bus, a network) to one another to transmit and/or receive signals (e.g., data) between one another.

The UE 10 may include the transmitter 52 and/or the receiver 54 that respectively enable transmission and reception of signals (e.g., user data) between the UE 10 and an external device via, for example, a network (e.g., including base stations or access points) or a direct connection. As illustrated, the transmitter 52 and the receiver 54 may be combined into the transceiver 30. The UE 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with one or more beams and various configurations. In some embodiments, multiple antennas of the antennas 55A-55N of an antenna group or module may be communicatively coupled to a respective transceiver 30 and each emit radio frequency signals that may constructively and/or destructively combine to form a beam. The UE 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means. While the present disclosure refers to the transmitter 52 and/or the receiver 54 as a cellular transmitter and/or cellular receiver, it should be understood that, as discussed above, the transmitter 52 and/or the receiver 54 may additionally or alternatively communicate with any other suitable communication network or device.

The UE 10 may include the BSS receiver 56 that may enable the UE 10 to receive BSS (e.g., radio signals, broadcast television signals, wake-up signals) from a broadcast service network. The broadcast service network may include one or more ground stations and/or one or more satellites (e.g., non-terrestrial stations) configured to transmit the broadcast network service signals (e.g., BSS). As discussed herein, in some embodiments, the BSS receiver 56 may include a low power receiver that, in operation, consumes less power than the receiver 54 as it is lower in complexity (e.g., may not demodulate a received signal, may not amplify a received signal, may not filter a received signal, or so on). That is, the BSS receiver 56 may include fewer or less complex components than the receiver 54, such that, in operation, it uses less power than the receiver 54. For example, the BSS receiver 56 may not include a demodulator, an amplifier, a filter, or the like, where the receiver 54 does include such a component. Moreover, the various components of the UE 10 may be coupled together by a bus system 58. The bus system 58 may include a data bus, for example, as well as a power bus, a control signal bus, and a status signal bus, in addition to the data bus. The components of the UE 10 may be coupled together or accept or provide inputs to each other using some other mechanism. It should be understood that, in some embodiments, the BSS receiver 56 may be a same receiver as the receiver 54, described herein as configured to receive data from a network, such as a wireless communication network (e.g., cellular network, an MBB network). In such embodiments, the receiver 54 may be configured to receive both BSS from a broadcast service network and wireless signals from a cellular network (e.g., MBB network).

Figures 3, 4, 5:
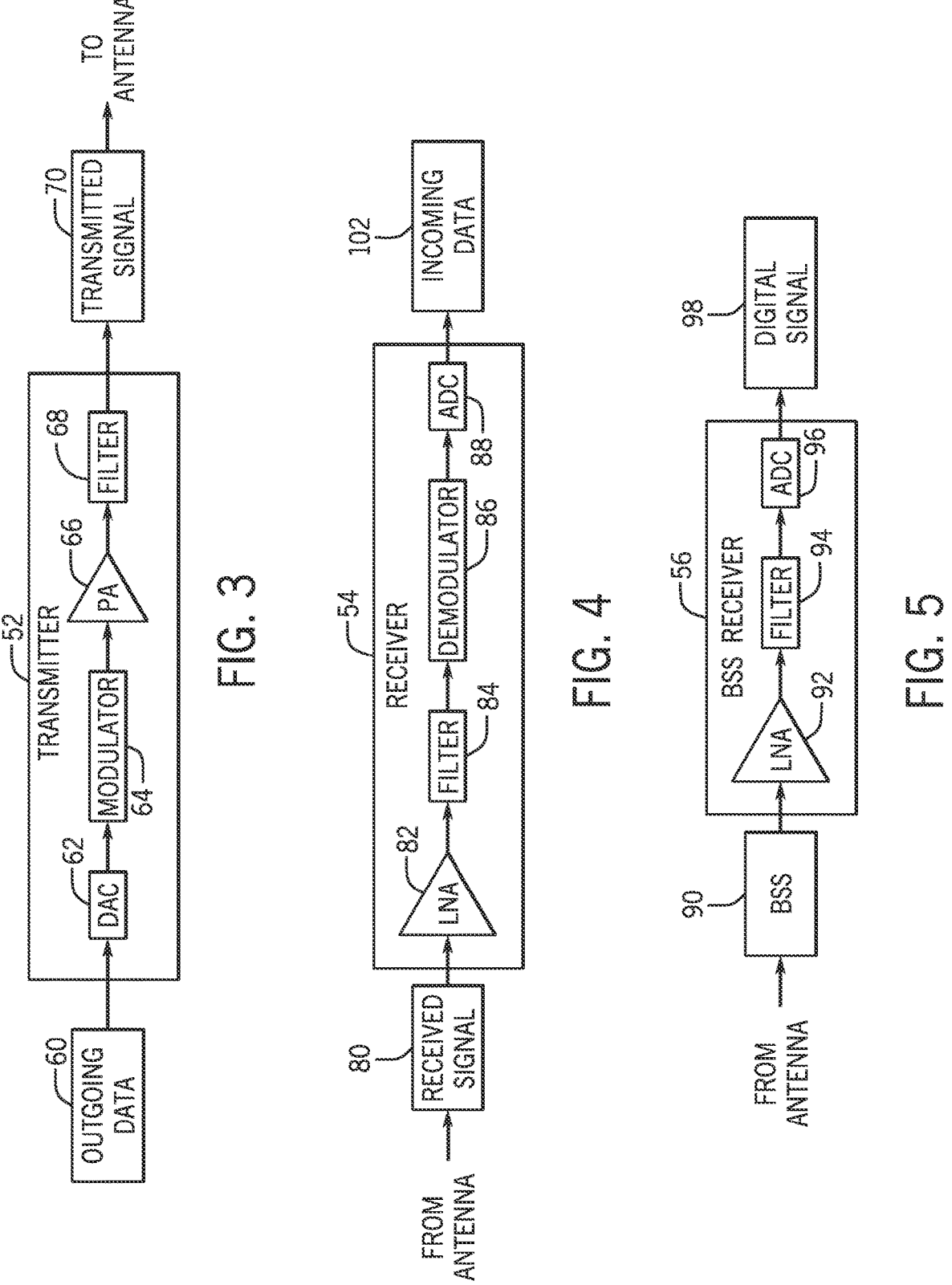
FIG. 3 is a schematic diagram of a transmitter of the user equipment of FIG. 1, according to embodiments of the present disclosure.
FIG. 4 is a schematic diagram of a receiver of the user equipment of FIG. 1, according to embodiments of the present disclosure.
FIG. 5 is a schematic diagram of a broadcast service signals (BSS) receiver of the user equipment of FIG. 1, according to embodiments of the present disclosure.

FIG. 3 is a schematic diagram of the transmitter 52 (e.g., transmit circuitry), according to embodiments of the present disclosure. As illustrated, the transmitter 52 may receive outgoing data 60 in the form of a digital signal to be transmitted via the one or more antennas 55. A digital filter (e.g., filter circuitry and/or software) of the transmitter 52 may remove components from the digital signal that are outside of a desired frequency range. In some cases, the digital filter may be tuned to (e.g., filter components outside of) a certain frequency range or fixed step size, such as a radio frequency (RF) channel bandwidth (e.g., 5 MHz, 10 MHz, and so on). In other cases, the digital filter may be tuned to any allocable bandwidth (e.g., 1 MHz or less, 5 MHz or less, 10 MHz or less, and so on). The digital filter may include any suitable filter that performs digital signal processing, including, for example, a linear filter, a causal filter, a time-invariant filter, a stable filter, a finite impulse response (FIR) filter, and so on. A digital-to-analog converter (DAC) 62 of the transmitter 52 may convert the digital signal to an analog signal, and a modulator 64 may combine the converted analog signal with a carrier signal to generate a radio wave. A power amplifier (PA) 66 receives the modulated signal from the modulator 64. The power amplifier 66 may amplify the modulated signal to a suitable level to drive transmission of the signal via the one or more antennas 55. A filter 68 (e.g., filter circuitry and/or software) of the transmitter 52 may then remove undesirable noise from the amplified signal to generate transmitted signal 70 to be transmitted via the one or more antennas 55. The filter 68 may include any suitable filter or filters to remove the undesirable noise from the amplified signal, such as a bandpass filter, a bandstop filter, a low pass filter, a high pass filter, and/or a decimation filter.

The power amplifier 66 and/or the filter 68 may be referred to as part of a radio frequency front end (RFFE), and more specifically, a transmit front end (TXFE) of the UE 10. Additionally, the transmitter 52 may include any suitable additional components not shown, or may not include certain of the illustrated components, such that the transmitter 52 may transmit the outgoing data 60 via the one or more antennas 55. For example, the transmitter 52 may include a mixer and/or a digital up converter. As another example, the transmitter 52 may not include the filter 68 if the power amplifier 66 outputs the amplified signal in or approximately in a desired frequency range (such that filtering of the amplified signal may be unnecessary).

FIG. 4 is a schematic diagram of the receiver 54 (e.g., receiver circuitry), according to embodiments of the present disclosure. As illustrated, the receiver 54 may receive received signal 80 from the one or more antennas 55 in the form of an analog signal. A low noise amplifier (LNA) 82 may amplify the received analog signal to a suitable level for the receiver 54 to process. A filter 84 (e.g., filter circuitry and/or software) may remove undesired noise from the received signal, such as cross-channel interference. The filter 84 may also remove additional signals received by the one or more antennas 55 that are at frequencies other than the desired signal. The filter 84 may include any suitable filter or filters to remove the undesired noise or signals from the received signal, such as a bandpass filter, a bandstop filter, a low pass filter, a high pass filter, and/or a decimation filter. The low noise amplifier 82 and/or the filter 84 may be referred to as part of the RFFE, and more specifically, a receiver front end (RXFE) of the UE 10.

A demodulator 86 may remove a radio frequency envelope and/or extract a demodulated signal from the filtered signal for processing. An analog-to-digital converter (ADC) 88 may receive the demodulated analog signal and convert the signal to a digital signal of incoming data 89 to be further processed by the UE 10. A digital filter (e.g., filter circuitry and/or software) of the receiver 54 may remove components from the digital signal that are outside of a desired frequency range to generate incoming data 89 to be further processed by the UE 10. In some cases, the digital filter may be tuned to (e.g., filter components outside of) a certain frequency range or fixed step size, such as an RF channel bandwidth (e.g., 5 MHz, 10 MHz, and so on). In other cases, the digital filter may be tuned to any allocable bandwidth (e.g., 1 MHz or less, 5 MHz or less, 10 MHz or less, and so on). The digital filter may include any suitable filter that performs digital signal processing, including, for example, a linear filter, a causal filter, a time-invariant filter, a stable filter, a finite impulse response (FIR) filter, and so on. Additionally, the receiver 54 may include any suitable additional components not shown, or may not include certain of the illustrated components, such that the receiver 54 may receive the received signal 80 via the one or more antennas 55. For example, the receiver 54 may include a mixer and/or a digital down converter.

FIG. 5 is a schematic diagram of the BSS receiver 56 (e.g., BSS receiver circuitry), according to embodiments of the present disclosure. As illustrated, the BSS receiver 56 may receive a BSS 90 from the one or more antennas 55 in the form of an analog signal. It should be understood that the one or more antennas 55 may be the same, different, or overlap with the one or more antennas 55 from which the receiver 54 received the received signal 80 and/or with which the transmitter 52 transmitted the transmitted signal 70. A low noise amplifier (LNA) 92 may amplify the received analog signal to a suitable level for the BSS receiver 56 to process. An analog filter 94 (e.g., filter circuitry and/or software) may remove undesired noise from the received signal, such as cross-channel interference. The analog filter 94 may also remove additional signals received by the one or more antennas 55 that are at frequencies other than the desired signal. The analog filter 94 may include any suitable filter or filters to remove the undesired noise or signals from the received signal, such as a bandpass filter, a bandstop filter, a low pass filter, a high pass filter, and/or a decimation filter. An analog-to-digital converter (ADC) 96 may receive the filtered analog signal and convert the signal to a digital signal 98. In some embodiments, the digital signal 98 may cause the processor 12 of the UE 10 to activate or power on the receiver 54 (e.g., a cellular signal). In some embodiments, the receiver 54 may already be active at a time the BSS signal is received via the BSS receiver 56. Additionally, the BSS receiver 56 may include any suitable additional components not shown, or may not include certain of the illustrated components, such that the BSS receiver 56 may receive the BSS 90 via the one or more antennas 55. For example, the BSS receiver 56 may include a demodulator, a mixer, and/or a digital down converter. As another example, the BSS receiver 56 may not include the LNA 82, the analog filter 84, and/or the ADC 88.

The BSS receiver 56 may include a low complexity radio that receives the BSS 90 associated with a respective broadcast service network that the UE 10 may be in range of (e.g., the UE 10 is within a coverage area of broadcast service network, the UE 10 is in range of a broadcast service station). In some embodiments, the BSS 90 may include a wake-up signal, that when received by the UE 10, may initiate a transition of the receiver 54 (e.g., a cellular modem) from a power save mode to an active state (e.g., to receive a network paging message, to receive and respond to a network command, to receive data, and so on). In this way, the BSS receiver 56 may enable the UE 10 to save power by avoiding waking up or activating the receiver 54 and its corresponding baseband functionality/components. Furthermore, in some embodiments, the BSS receiver 56 may be configured to receive the BSS 90 when the UE 10 is out-of-network and/or in a location not associated with cellular network coverage (e.g., outside of MBB network coverage areas). As such, the BSS 90 may include a low-frequency signal transmitted via high-power broadcasting infrastructure that may cover a wider area as compared to cells associated with a wireless cellular network (e.g., MBB network cells). In addition, as further discussed herein, coverage areas associated with the broadcast service network may include areas not covered by coverage areas associated with the cellular network. The BSS 90 may include a narrow bandwidth, such as 300 kilohertz (kHz) or less, 100 kHz or less, 50 kHz or less, 30 kHz or less, 15 kHz or less, and so on.

In some embodiments, as further discussed herein, the BSS 90 may include data associated with important information and/or services, such as emergency broadcast services and emergency broadcast notifications. For example, the BSS 90 may be configured to include data associated with the emergency broadcast services and/or notifications, and when received, cause the UE 10 to display (e.g., automatically display) the notifications. In some embodiments, the BSS 90 may include a pointer signal and include information associated with a broadcast information channel (e.g., a location on the frequency spectrum associated with the broadcast information channel) that may include the emergency broadcast notifications/information. For example, the BSS 90 may be configured to direct the UE 10 to a frequency band associated with the broadcast information channel (e.g., different than the frequency band associated with the BSS 90) to receive broadcast service information. Additionally or alternatively, in some embodiments, the BSS 90 may include information utilized by the UE 10 to enable the UE 10 to more efficiently search and connect with a wireless cellular network (e.g., MMB network). For example, the BSS 90 may include one or more cellular network parameters and/or direct the UE 10 to the broadcast information channel to receive the one or more cellular network parameters. The cellular network parameters may include band, channel, and/or frequency identification (ID) of cellular access nodes (e.g., cellular network stations) in proximity to the UE 10. In addition, the cellular network parameters may include timing information and/or geographical location (e.g., ephemeris information) associated with nearby cellular networks.

Figure 6:
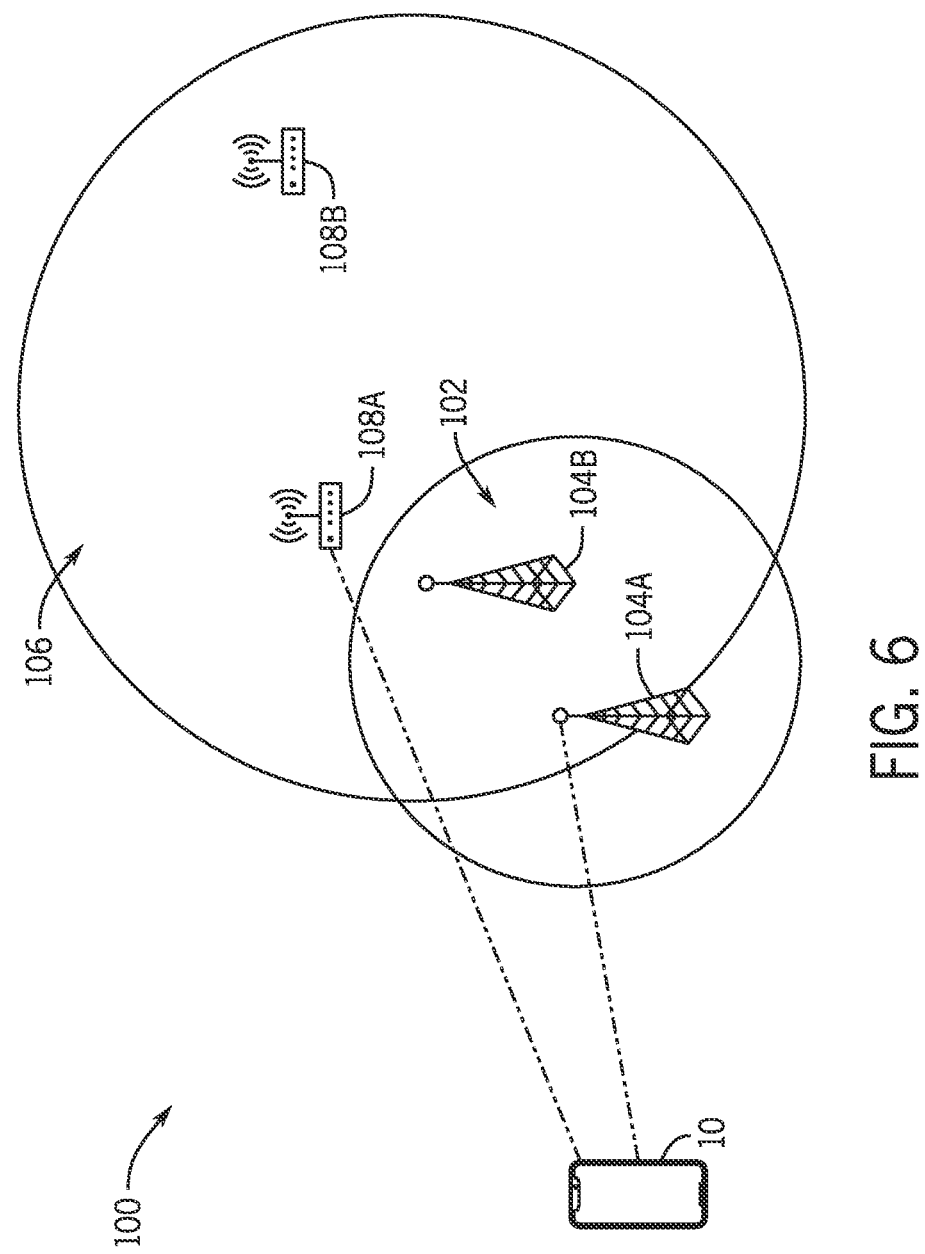
FIG. 6 is a schematic diagram of a communication system including the user equipment of FIG. 1 communicatively coupled to a wireless communication (e.g., cellular) network supported by base stations and a broadcast service network supported by broadcast service signal nodes, according to embodiments of the present disclosure.

With the foregoing in mind, FIG. 6 is a schematic diagram of a communication system 100 including the UE 10 of FIG. 1 communicatively coupled to a wireless communication network 102 (e.g., a cellular network, a MBB network) supported by base stations 104A, 104B (collectively 104) and a broadcast service network 106 supported by BSS nodes 108A, 108B (collectively 108), according to embodiments of the present disclosure. In particular, the base stations 104 may include Next Generation NodeB (gNodeB or gNB) base stations and may provide 5G/NR coverage via the wireless communication network 102 to the UE 10. The base stations 104 may include any suitable electronic device, such as a communication hub or node that facilitates, supports, and/or implements the network 102. In some embodiments, the base stations 104 may include Evolved NodeB (eNodeB) base stations and may provide 4G/LTE coverage via the wireless communication network 102 to the UE 10. Each of the base stations 104 may include at least some of the components of the UE 10 shown in FIGS. 1 and 2, including one or more processors 12, the memory 14, the storage 16, the transceiver 30, the transmitter 52, the receiver 54, and the associated circuitry shown in FIG. 4. It should be understood that while the present disclosure may use 5G/NR as an example specification or standard, the embodiments disclosed herein may apply to other suitable specifications or standards (e.g., such as the 4G/LTE specification, a 6G specification, a beyond-6G specification, and so on). Moreover, the network 102 may include any suitable number of base stations 104 (e.g., one or more base stations 104, four or more base stations 104, ten or more base stations 104, and so on).

The broadcast service network 106 may operate independently of and/or overlay or cover, at least in part, the same geographical areas as the cellular network 102. The cellular network 102 and the broadcast service network 106 may be operated by the same or different operators. In some embodiments, interconnections between the two networks 102, 106 may enable a cellular operator to cause a BSS signal 90 to be transmitted to the UE 10 (e.g., according to defined configurations).

If the broadcast service network 106 and the cellular network 102 do not share the same operator, then a mechanism for the UE 10 to fallback to either another BSS carrier (e.g., of the broadcast service network 106) or to cellular paging (e.g., of the cellular network 102) if the UE 10 loses broadcast service network 106 coverage may be implemented. The UE 10 may maintain two independent cell re-selection processes: one for the BSS layer and for the cellular layer. Once configured with a BSS channel, the UE 10 may maintain signal strength or quality metrics (e.g., measurements), the UE 10 may be configured with additional BSS channels to monitor in order to enable mobility over the BSS layer, and the cellular network 102 may allocate resources for the UE 10 to report BSS layer measurements (e.g., signal strength, signal quality, and so on). Mobility across the BSS nodes 108 may be defined based on a re-selection threshold of the BSS nodes 108 by the UE 10. For example, a BSS node 108 re-selection threshold may be defined based on signal strength (e.g., Reference Signal Receiver Power (RSRP)) of a currently configured BSS channel. That is, if the signal strength of the currently configured BSS channel is less than the re-selection threshold, then a re-selection process may be performed by the UE 10. For example, if the UE 10 is in sleep mode (e.g., the BSS receiver 56 is active), and if the BSS node 108 re-selection threshold is triggered (e.g., the signal strength of the currently configured BSS channel is less than the re-selection threshold), then the UE 10 (e.g., the cellular receiver 54) may wake up to receive cellular paging (e.g., from the cellular network 102), or to transmit a BSS node 108 re-selection event (e.g. via a Media Access Control (MAC) header bit) and subsequently receive a new BSS configuration (e.g., from a new BSS signal node 108).

In some embodiments, if the UE 10 is configured to listen to a BSS 90 (e.g., its BSS receiver 56 is active), then the UE 10 may monitor for or be capable of detecting a presence of the broadcast service network 106. Depending on the design of the BSS 90, the UE 10 may re-select from one BSS node 108 to another. For example, the UE 10 may select a first BSS node 108 for coverage of the broadcast service network 106, determine that the coverage of the broadcast service network 106 provided by the first BSS node 108 is lost, and select a second BSS node 108 for the coverage of the broadcast service network 106. As such, the UE 10 may receive the BSS 90 from the second BSS node 108.

If the broadcast service network 106 coverage is lost, the UE 10 may fall back to a normal or standardized cellular network 102 re-selection process (e.g., as provided under cellular technology specifications) or paging and/or send an indication to the cellular network 102 (e.g. through the normal Radio Resource Control (RRC) resume procedure) that it has switched from the mode of listening for a BSS 90 (e.g., a wake-up signal) to cellular network paging (e.g., listening to cellular signals using its cellular receiver 54). For example, the UE 10 may select a BSS node 108 for coverage of the broadcast service network 106, determine that the coverage of the broadcast service network 106 provided by the BSS node 108 is lost, activate the cellular receiver 54 and deactivate the BSS receiver 56 based on the coverage of the broadcast service network 106 provided by the BSS node 108 being lost, and cause the cellular receiver 54 to receive a cellular signal from a base station 104 (e.g., cellular network paging signals) or cause the cellular transmitter 52 to transmit a cellular signal to a base station 104 (indicating to the cellular network 103 (e.g. through the RRC resume procedure) that it has switched from the mode of listening for the BSS 90 to cellular network paging.

Figure 7:
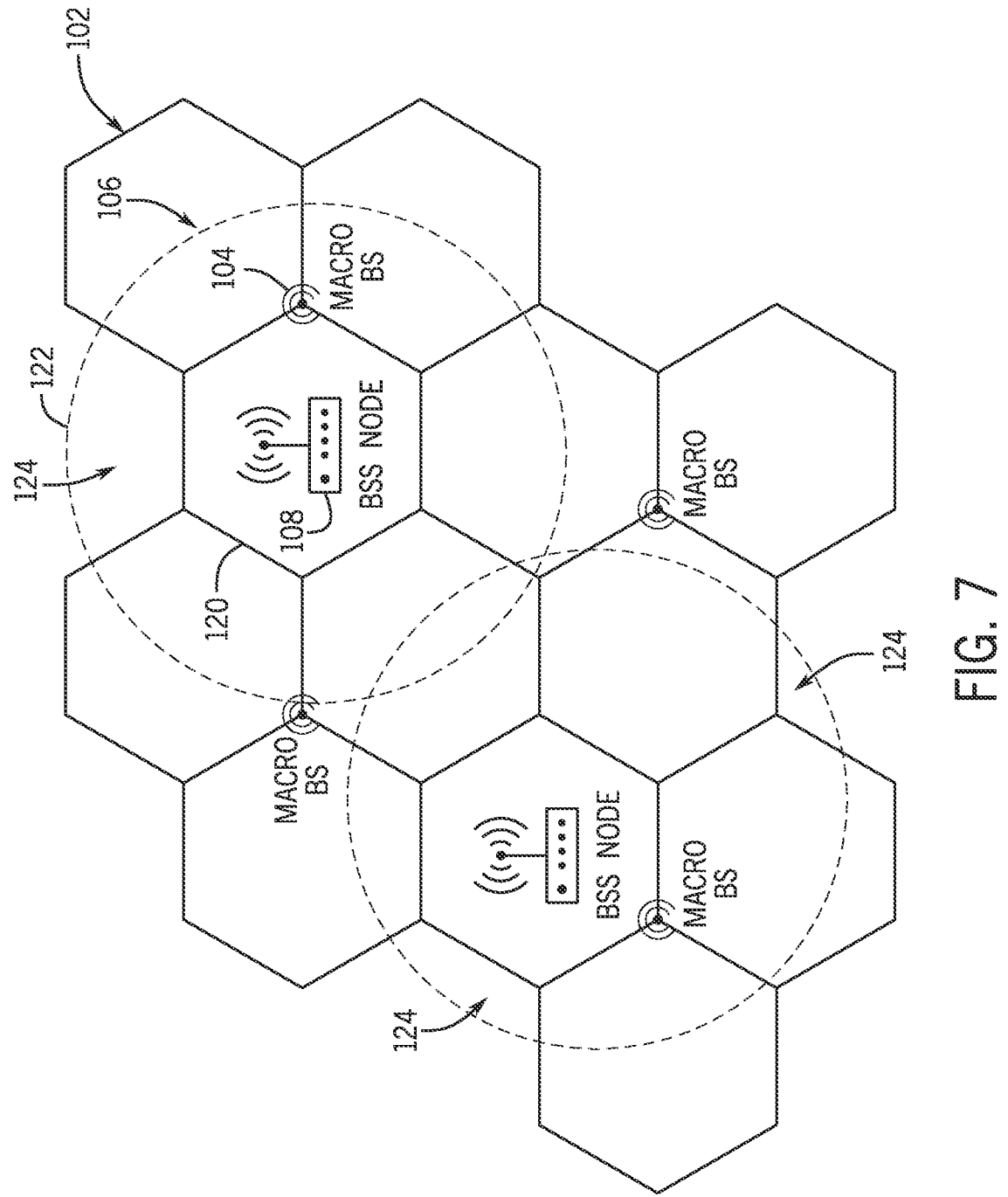
FIG. 7 is a schematic diagram of coverage cells of the base stations of the wireless communication (e.g., cellular) network and coverage cells of the BSS nodes of the broadcast service network of FIG. 6, according to embodiments of the present disclosure.

Additionally, the broadcast service network 106, via the BSS nodes 108, may operate on a low frequency spectrum (e.g., 1 gigahertz or less, 800 megahertz (MHz) or less, within a range of 500 MHz to 680 MHz, 400 MHz to 600 MHz, and so on) and transmit via high-power broadcasting infrastructure. As such, a size of a coverage area (e.g., cells of) each BSS node 108 may, in some embodiments, be greater than a coverage area (e.g., cell cluster, cells of) associated with the base stations 104. For example, FIG. 7 is a schematic diagram of coverage areas or cells 120 (e.g., cell clusters) of the base stations 104 (e.g., macro base stations 104) of the network 102 (e.g., MBB network, cellular network) and coverage areas or cells 122 of the BSS nodes 108 of the broadcast service network 106. As illustrated, it may be observed that the cells 122 of the BSS nodes 108 have a greater coverage area than the coverage area associated with the cells 120 of the base stations 104. In particular, each base station 104 provides network services (e.g., connectivity, network coverage) to each of the cells 120 that it touches, while each BSS node 108 provides broadcast network services (e.g., connectivity) to each cell 122 of which it is a center. Specifically, in the illustrated example, the cell clusters 120 of the base stations 104 each include three cells (e.g., supported by a respective base station 104), and the cell 122 associated with each BSS node 108 is one cell (e.g., supported by a respective BSS node 108). However, each of the cell and/or cell clusters of the base stations 104 and/or the BSS nodes 108 may include any suitable number of cells (e.g., two cells, four cells, ten cells, and so on) that are supported by any suitable number of respective base stations 104 and/or BSS nodes 108. In addition, as illustrated in FIG. 7, the coverage area of the broadcast service network 106 (e.g., represented by circles) may be non-uniform when compared to the coverage area of the network 102 (e.g., represented by interconnecting hexagonal shapes). In some embodiments, a cell 122 (e.g., a single cell 122) associated with coverage area of the broadcast service network 106 may cover (e.g., overlap, overlay) multiple cells 120 (e.g., more than one cell 120, two or more cells 120) associated with coverage of the network 102. Additionally, in some embodiments, the cells 122 associated with coverage area of the broadcast service network 106 may cover (e.g., overlap, overlay) areas (e.g., locations, geographical areas) that are not supported and/or covered by the network 102. For example, as illustrated in FIG. 7, the cells 122 of the broadcast service network 106 cover areas 124, which are not supported by and/or included in any coverage area associated with the network 102 (e.g., any of cells/cell clusters 120).

Figure 8:
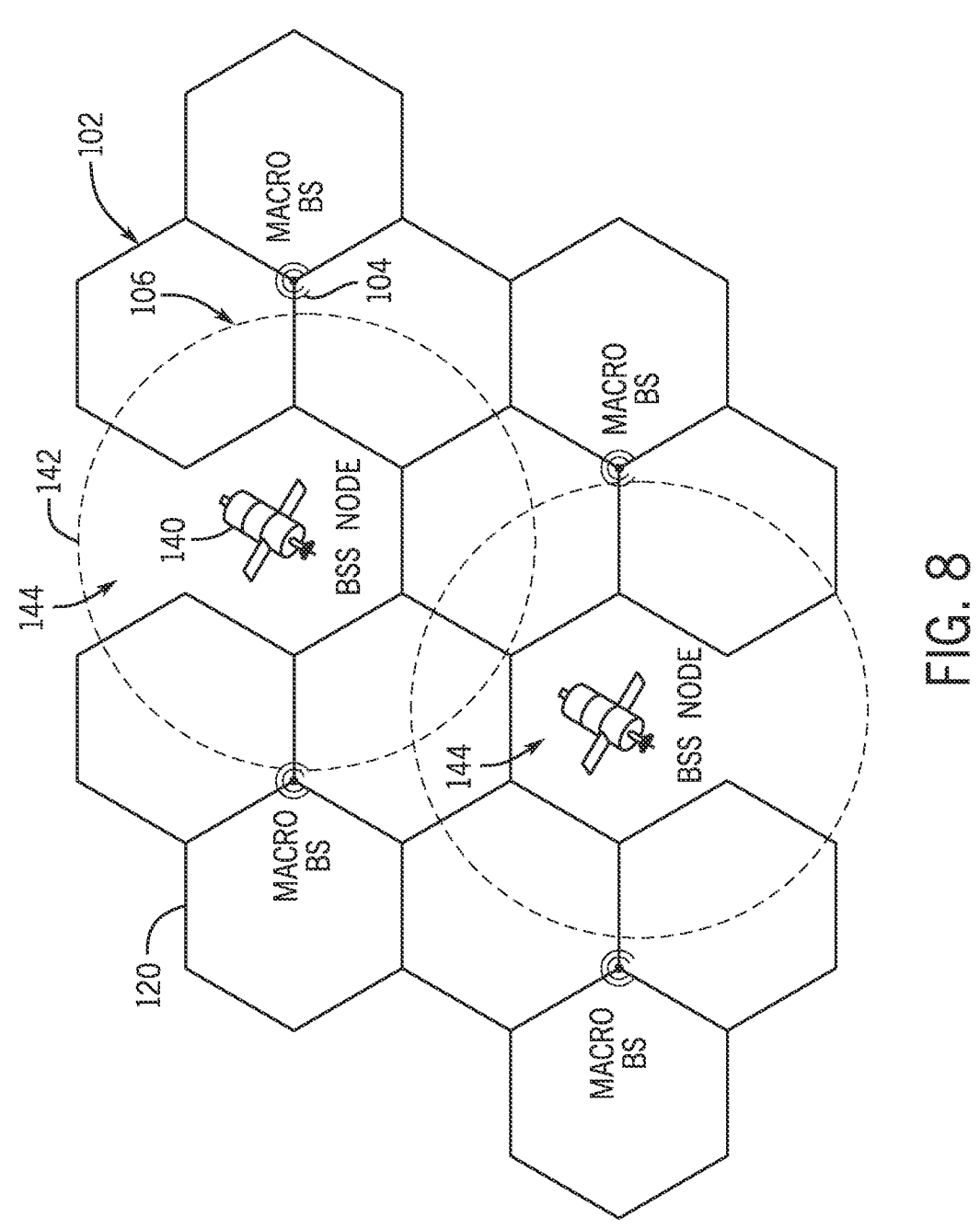
FIG. 8 is a schematic diagram of coverage cells of the base stations of the wireless communication (e.g., cellular) network and coverage cells of non-terrestrial broadcast service signal nodes of the broadcast service network of FIG. 6, according to embodiments of the present disclosure.

As another example, FIG. 8 is a schematic diagram of coverage cells 120 of the base stations 104 of the wireless communication (e.g., cellular, MBB) network 102 and coverage cells 142 of non-terrestrial network (NTN) BSS nodes 140 (e.g., satellites) of the broadcast service network 106 of FIG. 6. Similar to FIG. 7, it may be observed that the cells 142 of the non-terrestrial BSS nodes 140 have a greater coverage area than the coverage area associated with the cells 120 of the base stations 104. In particular, each base station 104 provides network services (e.g., connectivity, network coverage) to each of the cells 120 that it touches, while each non-terrestrial BSS node 140 provides broadcast network services (e.g., connectivity) to each cell 142 of which it is a center. Specifically, in the illustrated example, the cell clusters 120 of the base stations 104 each include three cells (e.g., supported by a respective base station 104), and the cell 142 associated with each non-terrestrial BSS node 140 is one cell (e.g., supported by a respective non-terrestrial BSS node 140). However, each of the cell and/or cell clusters of the base stations 104 and/or the non-terrestrial BSS nodes 140 may include any suitable number of cells (e.g., two cells, four cells, ten cells, and so on) that are supported by any suitable number of respective base stations 104 and/or BSS nodes 108. In addition, as illustrated in FIG. 8, the coverage area of the broadcast service network 106 (e.g., represented by circles) may be non-uniform when compared to the coverage area of the network 102 (e.g., represented by interconnecting hexagonal shapes). In some embodiments, a cell 142 (e.g., a single cell 142) associated with coverage area of the broadcast service network 106 may cover (e.g., overlap, overlay) multiple cells 120 (e.g., more than one cell 120, two or more cells 120) associated with coverage of the network 102. Additionally, in some embodiments, the cells 142 associated with coverage area of the broadcast service network 106 may cover (e.g., overlap, overlay) areas (e.g., locations, geographical areas) that are not supported and/or covered by the network 102. For example, as illustrated in FIG. 8, the cells 142 of the broadcast service network 106 cover areas 144, which are not supported by and/or included in any coverage area associated with the network 102 (e.g., any of cells/cell clusters 120).

In addition, the present disclosure includes dedicating a spectrum to the BSS 90, thereby enabling a low complexity receiving solution and avoiding reducing the spectral efficiency of cellular communications by not configuring the BSS 90 in-channel with desired data (e.g., received via the cellular signals). Practically, a licensed spectrum may be reused for broadcast operation (e.g., broadcast service network 106). In some embodiments, the BSS 90 may be broadcast on channels of television whitespaces (e.g., frequency ranges, including guard bands, in between television channels). For example, television channels 19 through 36 span a frequency range of 500 MHz to 608 MHz. Each television channel is 6 MHz wide with a 0.309 MHz guard band on each side (e.g., to prevent interference between television channels). In total, there is 11.14 MHz available in this guard band spectrum. The Federal Communications Commission (FCC) ruled (in FCC-19-24A1_Rcd) that the FCC's Part 15 rules allow unlicensed whitespace devices to operate at locations where frequencies are not used by licensed services. In particular, the FCC authorized operation of unlicensed devices in unused channels of broadcast television spectrum, in the guard band between television spectrum and 600 MHz downlink services, in the guard band between the 600 MHz service band uplinks and downlinks (e.g., the 600 MHz duplex gap), and television channel 37. As such, it is contemplated that any of these authorized whitespaces may be used to for broadcasting the BSS 90.

Figure 9:
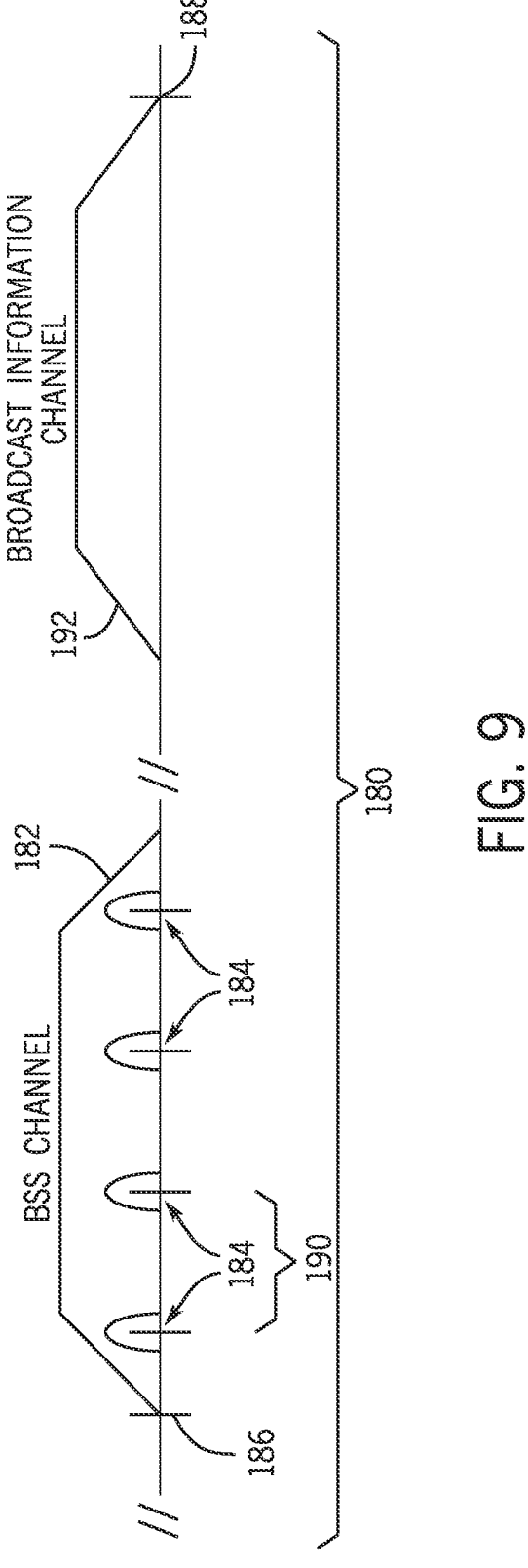
FIG. 9 is a frequency diagram of broadcast service signal channelization of a broadcast service signal frequency band, according to embodiments of the present disclosure.

FIG. 9 is a frequency diagram of BSS channelization of a BSS frequency band 180, according to embodiments of the present disclosure. In some embodiments, the BSS band 180 may correspond to a frequency span allocated by regulation for terrestrial broadcast operation (e.g., by the broadcast service network 106). For example, the BSS band 180 may include and/or be a similar frequency spectrum as a wake-up signal band and include the television whitespace spectrum between 500 MHz to 608 MHz. In some embodiments, the BSS band 180 may be a different frequency span from the wake-up signal band. For example, the BSS band 180 may be a low frequency spectrum at 1 gigahertz or less, 800 megahertz (MHz) or less, within a range of 500 MHz to 680 MHz, 400 MHz to 600 MHz, and so on. The BSS band 180 may include multiple BSS channels 182, of which one is illustrated. Each BSS channel 182 may correspond to a grouping of multiple BSS resources allocated to different UE 10 within the BSS band 180. In particular, each BSS channel 182 may include multiple BSS raster points 184, which may correspond to a frequency used by a BSS 90 associated with a specific UE 10. The BSS raster points 184 may be defined in a specification (e.g., 3GPP specification or ITU agreement) or by configuration (e.g., of the broadcast service network 106 and/or the UE 10). When defined by configuration, the BSS raster points 184 may also be set based on a UE 10 capability indicating a preferred raster density (e.g., frequency difference 190 between BSS raster points 184).

Furthermore, each of the BSS 90 associated with a respective BSS raster point 184 may include a narrow band broadcast signal. In addition, the BSS 90 may be transmitted (e.g., via the BSS nodes 108, 140) using high-power broadcasting infrastructure and at a low frequency spectrum. Thus, a range of the BSS 90 may be greater than a range of wireless cellular signals (e.g., transmitted via the base stations 104), as seen in FIGS. 7 and 8. As discussed herein, UE 10 receiving the BSS 90 may utilize less power (e.g., lower power consumption) to receive and process the BSS 90, as compared to power used by the UE 10 to receive and process wireless cellular signals. As discussed herein, this may enable a UE 10 to utilize a low-power receiver (e.g., the BSS receiver 56) to receive the BSS 90. In addition, a UE 10 may be in and/or remain in a sleep, inactive, and/or low-power mode when receiving and/or processing the BSS 90. Moreover, as further discussed herein, the BSS 90 may be used to transmit and/or convey broadcast service information, such as emergency service notifications, wake-up signals, and/or cellular network access parameters. In addition, in some embodiments, the BSS 90 may be a pointer signal configured to direct the UE 10 to another frequency band (e.g., the broadcast information channel) to receive the broadcast service information.

As an example, if the BSS band 180 includes the television whitespace spectrum between 500 MHz to 608 MHz, then a beginning 186 of the BSS band 180 may be set at 500 MHz, and an end 188 of the BSS band 180 may be set at 608 MHz. Each BSS channel 182 bandwidth may be of any suitable bandwidth less than that of the BSS band 180, such as 50 MHz or less, 30 MHz or less, 10 MHz or less, 1 MHz or less, 600 kHz or less, 500 kHz or less, 100 kHz or less, and so on. A frequency difference 190 between BSS raster points 184 may be any suitable frequency difference less than that of the BSS channel 182 bandwidth, such as 1 MHz or less, 500 kHz or less, 300 kHz or less, 100 kHz or less, 50 kHz or less, 30 kHz or less, 10 kHz or less, and so on). Furthermore, as each BSS channel 182 may be disposed within guard bands of between television channels, a television channel may be disposed at a frequency region between the BSS channels 182. As exemplified by the sparse comb-like availability of guard bands in the television whitespace spectrum, the BSS channels 182 may be distributed across multiple narrow frequency bands in the frequency domain (e.g., the BSS band 180). The BSS band 180 may be defined to span a large number of these narrow bands, with the BSS channels 182 specified in frequency subranges of the BSS band 180 as allowed or applicable.

In some embodiments, an amount of broadcast service information (e.g., data) may be too large to be transmitted via a BSS 90 (e.g., narrow channel, BSS channel 182) associated with a respective BSS raster point 184. In such embodiments, the BSS 90 may include configuration information (i.e. a pointer signal) that directs a UE 10 to a broadcast information channel 192 (e.g., wider broadcast channel when compared to the BSS channel 182, a separate channel from the BSS channel 182) to receive the broadcast service information. The broadcast information channel 192 may be located at a different frequency than the BSS channels 182, and be associated with different time domain resources. In addition, the broadcast information channel 192 may include the broadcast service information, such as emergency service notification and/or cellular network access parameters. In particular, the broadcast information channel may transmit the broadcast service information to all UE's 10 configured to receive the broadcast information channel 192 and located within a coverage area of the broadcast service network 106. As a pointer signal, the BSS 90 may include an indication of a location (e.g., a frequency and/or time domain resources) of the broadcast information channel 192 on the BSS frequency band 180, and further the UE 10 may receive the BSS 90 and configured the BSS receiver 56 to receive the broadcast information channel 192 based on the indication of the location of the broadcast information channel 192.

Although FIG. 9 illustrates the broadcast information channel 192 as having a frequency range within the BSS band 180, it should be understood that, in some embodiments, the broadcast information channel 192 may be located at a different frequency band range (e.g., at higher or lower frequency band range) than that of the BSS band 180. For example, in some embodiments, the broadcast information channel 192 may be transmitted at frequency band ranges associated with a wireless cellular network (e.g., wireless communication network 102, MBB network), such as a 3G cellular network, a 4G cellular network, an LTE® cellular network, an LTE-LAA cellular network, a 5G cellular network and/or a NR cellular network, a 6G or greater than 6G cellular network, and so on. In addition, the broadcast information channel 192 may be received via a 4G (e.g., LTE), 5G, and/or 6G cellular radio receiver (e.g., receiver 54) of a UE 10, as opposed to the BSS receiver 56. Furthermore, the broadcast information channel 192 may include system parameters that are different from parameters of the BSS channel 182, such as different channel bandwidth (CBW), modulation, and/or coding scheme.

FIG. 10 is a flowchart of a method 200 for utilizing a BSS node 108, 140 of a broadcast service network 106 to transmit broadcast service information (e.g., wake-up signals, based on pointer signals, emergency service notification, cellular network access parameters, via a broadcast information channel, etc.) to UE 10, according to embodiments of the present disclosure. Any suitable device (e.g., a controller) that may control components of the UE 10, the wireless communication network 102 (e.g., cellular network, MBB network), the base stations (e.g., gNBs) 104, the broadcast service network 106, and/or the BSS nodes 108, 140, such as the processor 12, may perform the method 200. In some embodiments, the method 200 may be implemented by executing instructions stored in a tangible, non-transitory, computer-readable medium, such as the memory 14 or storage 16, using the processor 12. For example, the method 200 may be performed at least in part by one or more software components, such as an operating system of the UE 10, the wireless communication network 102, the base stations 104, the broadcast service network 106, and/or the BSS nodes 108, 140, one or more software applications of the UE 10, the network 102, the base stations 104, the broadcast service network 106, and/or the BSS nodes 108, 140, and the like. While the method 200 is described using steps in a specific sequence, it should be understood that the present disclosure contemplates that the described steps may be performed in different sequences than the sequence illustrated, and certain described steps may be skipped or not performed altogether.

Additionally, it should be understood that signal transmissions by the UE 10, the base station 104, and/or the BSS node 108, 140 may be sent by transmitters 52 of the UE 10, the base station 104, and/or the BSS node 108, 140, respectively, and signal receptions by the UE 10, the base station 104, and/or the BSS node 108, 140 may be sent by receivers 54 of the UE 10, the base station 104, and/or the BSS node 108, 140, respectively. Moreover, in some embodiments, the UE 10 may receive at least a portion of the BSS 90, sent by the BSS node 108, 140, by the BSS receiver 56.

In process block 202, the UE 10 and the base station 104 perform an initial access procedure. For example, the UE 10 may detect the base station 104 (e.g., a cell of the base station 104) by receiving a radio frequency (RF) signal when the UE 10 enters a coverage area of the base station 104 (e.g., a geographical region for which the base station 104 provides network coverage). The RF signal may include timing alignment information, among other information. The UE 10 may then synchronize to the base station 104 (e.g., the cell of base station 104) by aligning its timing with timing alignment information of the base station 104.

In process block 204, the UE 10 transmits an indication of capabilities (e.g., broadcast service signal capabilities) of its BSS receiver 56 to the base station 104. In particular, the UE 10 may transmit an indication that it has a BSS receiver 56, operating characteristics (e.g., operating capabilities) of the BSS receiver 56, configuration of the BSS receiver 56, settings of the BSS receiver 56, and so on. For example, the UE 10 may transmit an indication of its support of the BSS receiver 56 when operating in a connected state, an idle state, out-of-network state, an inactive state, or any combination thereof. As another example, the UE 10 may transmit an indication of its preferred raster density. In process block 206, the UE 10 and the base station 104 perform a Radio Resource Control (RRC) setup procedure. In particular, the UE 10 may transmit a request to establish an RRC connection with the base station 104, so that the UE 10 and the base station 104 may transfer user data, and the base station 104 may establish the RRC connection.

In process block 208, the base station 104 transmits a request for resources for the BSS receiver 56 (e.g., a BSS receiver provisioning request, via a handshake) to the BSS node 108, 140. In some embodiments, the BSS receiver provisioning request for resources may be based on the received indication of broadcast service signal capabilities associated with the BSS receiver 56. In particular, the BSS receiver provisioning request may include an indication of a BSS frequency band, a BSS channel, and/or a BSS raster point to identify a frequency domain location of a BSS 90 associated with the UE 10 (e.g., allocated to, assigned to). For example, the request for resources may include a BSS raster point 184 of a BSS channel 182. The BSS node 108, 140 may then transmit a BSS 90 having a frequency of or centered about the BSS raster point 184, which is intended for the UE 10. As such, the BSS receiver provisioning request may include an identifier associated with the UE 10 and/or the BSS receiver 56 of the UE 10. The broadcast service network 106 may allocate the resources, or decide not to allocate the resources, to the UE 10. In process block 210, the BSS node 108, 140 transmits a response to (e.g., confirming, authorizing, approving, permitting or denying) the request (e.g., a BSS receiver provisioning response) to the base station 104.

In process block 212, the base station 104 transmits one or more configurations and/or an indication of one or more configurations (e.g., one or more BSS configurations) for the BSS receiver 56 to the UE 10. The one or more configurations may be associated with the UE 10 in a connected and/or idle state. When in the connected state, the UE 10 is connected to and known by the base station 104, and may transmit user data to and receive user data from the base station 104. When in the idle state, the UE 10 is not connected to or known by the base station 104, though the UE 10 may be connected to or known by the wireless communication network 102. For example, the UE 10 may monitor paging and broadcast channels to maintain connectivity with the network 102, select a new cell as it moves, inform the network 102 of a new area that it enters (e.g., based on broadcast service information received from a BSS node 108, 140), and so on. As such, when in the idle state, the UE 10 may not transmit user data to nor receive user data from the base station 104. In some embodiments, the connected and the idle states may be that which is defined in the 5G specification. Additionally or alternatively, the idle state may include an inactive state, in which the UE 10 suspends an RRC session after there is no activity for a first period of time from when it was in the active state, prior to moving to the idle state if there is no activity for a second, longer period of time. As such, when in the inactive state, the UE 10 may not transmit user data to nor receive user data from the base station 104. In additional or alternative embodiments, the base station 104 may transmit a configuration for the BSS receiver 56 when the UE 10 is in the inactive state.

Furthermore, the one or more configurations for the BSS receiver 56 may include BSS resources allocated to the UE 10, such as a BSS frequency band, a BSS channel, and/or a BSS raster point to identify a frequency domain location of the BSS 90 associated with the UE 10 (e.g., allocated to, assigned to). In addition, the one or more configurations for the BSS receiver 56 may include a time trigger and/or a time offset and periodicity for the BSS receiver 56 to monitor (e.g., periodically monitor) the configured BSS resources. Furthermore, the one or more configurations for the BSS receiver 56 may include cellular network access parameters for the UE 10 to search and access a nearest and/or nearby wireless communication network 102. In addition, in some embodiments, the one or more configurations for the BSS receiver 56 may include broadcast information channel information, such as frequency and time domain resources associated with the broadcast information channel 192, configured to direct the UE 10 to the broadcast information channel to receive the broadcast service information.

For example, the base station 104 and/or the wireless communication network 102 may configure the UE 10 with BSS receiver configurations that include a BSS frequency band 180, a BSS channel 182, and/or a BSS raster point 184 to facilitate identifying a frequency domain location of the BSS 90 associated with the UE 10. In addition, the BSS node 108 may broadcast the BSS 90 using or having the BSS frequency band 180, the BSS channel 182, and/or the BSS raster point 184 to ensure that the BSS receiver 56 of the UE 10 receives the BSS 90. In another example, the base station 104 and/or the wireless communication network 102 may configure the UE 10 with BSS receiver configurations that include a time trigger or time offset and periodicity to monitor the configured BSS resources. As such, the base station 104 may send an indication of any of these configurations to the BSS node 108.

In process block 214, the UE 10 and the base station 104 are in a connected state session (e.g., the UE 10 is communicatively coupled to and configured to receive signals from the base station 104). As such, the UE 10 may transmit user data to and receive user data from the base station 104. In process block 216, the base station 104 transmits a request to send broadcast service information (e.g., a broadcast service message) via the BSS 90 resources provisioned to the UE 10 to the BSS node 108. In some embodiments, the base station 104 may transmit this request because it determines that the receiver 54 of the UE 10 should enter and/or is in a power saving mode (e.g., a low power mode, a deactivation mode, a sleep mode, and so on). In some embodiments, the base station 104 may determine that the receiver 54 is in the power saving mode because it has not been active for a threshold duration of time, has not received signals or user data for a threshold duration of time, and so on. In additional or alternative embodiments, the base station 104 may determine that the receiver 54 is in the power saving mode because the UE 10 has less than a threshold battery or power source life remaining. In some embodiments, the base station 104 may determine that the receiver 54 is in the power saving mode because of an indication that the UE 10 is not connected to (e.g., transmitting and/or receiving signals) the wireless communication network 102. For example, a location of the UE 10 may be outside of a coverage area of the network 102. In any of such cases, such conditions for which the base station 104 determines that the receiver 54 should enter and/or is in the power saving mode, and parameters for the conditions, such as the threshold duration of time or threshold battery or power source life remaining, may be configured by the UE 10 (e.g., by a user, by default, by a machine-learning algorithm). Additionally or alternatively, in some embodiments, the base station 104 may transmit the request to send the broadcast service information in response to an emergency service operation. For example, an emergency service may issue an indication of a notification (e.g., emergency message, announcement, information) to the wireless communication network 102, and the base station 104 may transmit the request to send the broadcast service information associated with the notification based on the indication.

In process block 218, the BSS node 108 transmits the broadcast service information via the BSS 90 resources provisioned to the UE 10 based on the request. In process block 220, the UE 10 receives the broadcast service information via the BSS 90. In addition, the UE 10 may configure the cellular receiver 54 and/or the BSS receiver 56, and/or may display information (e.g., notifications, via display 18) based on the broadcast service information. As discussed herein, the broadcast service information may include emergency service notifications, wake-up signals, cellular network access parameters, or any combination thereof. In addition, the broadcast service information may be received based on pointer signals. For example, the emergency service notification may include an emergency message, announcement, information that may be important and/or useful for a user of the UE 10 to know. The emergency service notification may be based on a geographic location, and the UE 10 may receive a particular emergency service notification based on the location of the UE 10 and/or a location of the BSS node 108, 140 and/or base station 104 that the UE 10 is communicatively coupled to and/or within the coverage area of. As further discussed below, the UE 10 may receive the broadcast service information via the BSS 90 even when the UE 10 is not within a coverage area associated with the base station 104, and/or when the UE 10 is in a low-power mode or idle state.

Furthermore, as discussed herein, the broadcast service information may include wake-up signals configured to activate or wake up the cellular receiver (e.g., receiver 54), which may begin receiving wireless signals (e.g., cellular signals having user data). For example, the UE 10 may be in a sleep or power-saving mode, or be deactivated (e.g., powered off. The BSS receiver 56 may then periodically scan for a wake-up signal sent from the broadcast service network 106 (e.g., transmitted via the BSS node 108, 140). Upon receiving the wake-up signal, the BSS receiver 56 may activate or wake up the cellular receiver (e.g., receiver 54), which may begin receiving wireless signals (e.g., cellular signals having user data) from the wireless communication network 102 (e.g., transmitted via the base station 104). As such, the UE 10 may cause its cellular receiver 54 to enter a power-saving mode and activate its BSS receiver 56 when it is not actively receiving data, ensuring that the BSS receiver 56 activates its cellular receiver 54 when there is data to send or receive, therefore saving power.

Moreover, in some embodiments, the broadcast service information may include cellular network access parameters. The cellular network access parameters may be used by the UE 10 to improve time to search and access a wireless communication network 102 that may be available in an area associated with the location of the UE 10 and/or assist the UE 10 in locating a nearby coverage area associated with the wireless communication network 102. For example, the cellular network access parameters may include a frequency band, a channel, and/or a frequency identification (ID) associated with nearby base stations 104 (e.g., nearby access to the wireless communication network 102), a coarse timing information and/or a fine timing information of nearby base stations 104 (e.g., to assist UE 10 in finding synchronization signal in timing information), a coarse geographical location information and/or a fine geographical location information of nearby base stations 104, or any combination thereof. In this way, the UE 10 may utilize the cellular network access parameters to perform a targeted search for the band, the channel, and/or the frequency ID associated with the nearby stations 104. As such, a time to search and access the wireless communication network 102 may be significantly reduced as compared to a UE 10's time to search and access the wireless communication network 102 that did not receive the cellular network access parameters. In particular, as further discussed herein, the UE 10 may be located outside of network coverage (e.g., out-of-network) associated with the wireless communication network 102 (e.g., not within a coverage area of the base station 104). However, the UE 10 may be communicatively coupled and/or in network coverage of the BSS node 108, 140 and may receive the cellular network access parameters via the BSS node 108, 140 to assist the UE 10 in locating a nearby coverage area associated with the wireless communication network 102, improve time to search and access the nearby wireless communication network 102, or both. It should be understood, that in some embodiments, the base stations 104 may be non-terrestrial network (NTN) nodes, such as satellites (e.g., satellite access nodes (SAN)). In such embodiments, the cellular network access parameters may include a band, a channel, and/or frequency ID associated with nearby/available satellite access nodes (SAN) 140, a coarse timing information and/or a fine timing information associated with the nearby/available SAN 140 (e.g., to assist UE 10 in finding synchronization signal in timing information), a coarse ephemeris location information and/or a fine ephemeris location information of the nearby/available SAN 140, or any combination thereof.

In addition, as discussed above, the broadcast service information may be received based on the BSS 90 being pointer signals, and including information that is configured to direct the UE 10 to another broadcast frequency band to receive the broadcast service information. For example, in some embodiments, the broadcast service information (e.g., data) may be too large to be transmitted via a BSS 90 (e.g., narrow channel, BSS channel 182) associated with a respective BSS raster point 184. In such embodiments, the BSS 90 associated with a BSS raster point 184 (e.g., allocated/provisioned to the UE 10) may be a pointer signal configured to direct a UE 10 to a broadcast information channel 192 (e.g., wider broadcast channel when compared to the BSS channel 182, a separate channel from the BSS channel 182) to receive the broadcast service information. The broadcast information channel 192 may be located at a different frequency than the BSS channels 182, and be associated with different time domain resources. In addition, the broadcast information channel 192 may include the broadcast service information, such as emergency service notifications and/or cellular network access parameters. In particular, the broadcast information channel may transmit the broadcast service information to all UE's 10 configured to receive the broadcast information channel 192 and located within a coverage area of the broadcast service network 106 (e.g., the BSS node 108, 140). As a pointer signal, the BSS 90 may include an indication of a location (e.g., a frequency and/or time domain resources) of the broadcast information channel 192 on the BSS frequency band 180, and further the UE 10 may receive the BSS 90 and configured the BSS receiver 56 to receive the broadcast information channel 192 based on the indication of the location of the broadcast information channel 192.

As discussed herein, the broadcast information channel 192 may be located at a different frequency band range (e.g., at higher or lower frequency band range) than that of a BSS band 180 (e.g., including the BSS raster points 184). For example, in some embodiments, the broadcast information channel 192 may be transmitted at frequency band ranges associated with a wireless cellular network (e.g., wireless communication network 102, MBB network), such as a 3G cellular network, a 4G cellular network, an LTE® cellular network, an LTE-LAA cellular network, a 5G cellular network and/or a NR cellular network, a 6G or greater than 6G cellular network, a non-terrestrial network, and so on. In addition, the broadcast information channel 192 may be received via a 4G (e.g., LTE), 5G, and/or 6G cellular radio receiver (e.g., receiver 54) of a UE 10, as opposed to the BSS receiver 56. Furthermore, the broadcast information channel 192 may include system parameters that are different from parameters of the BSS channel 182, such as different channel bandwidth (CBW), modulation, and/or coding scheme. In this manner, the method 200 may enable the UE 10 to utilize the BSS receiver 56 when the UE 10 is in a connected state (e.g., connected to the wireless communication network 102).

However, in some embodiments, in process block 222, the UE 10 may enter an idle state, such as a sleep mode and/or a power saving/low power mode. In particular, the UE 10 may at least cause its receiver 54 to enter a power saving or low power mode, and cause its BSS receiver 56 to activate (e.g., remain active) and configured to receive a BSS 90 from the BSS node 108. As similarly described in process block 216, in process block 224, the base station 104 transmits a request to send broadcast service information (e.g., a broadcast service message) via the BSS 90 resources provisioned to the UE 10 to the BSS node 108. In addition, as similarly described in process blocks 218 and 220, in process block 226, the BSS node 108 transmits the broadcast service information via the BSS 90 resources provisioned to the UE 10 based on the request, and in process block 228, the UE 10 receives the broadcast service information via the BSS 90. In this manner, the method 200 may enable the UE 10 to utilize the BSS receiver 56 when the UE 10 is in an idle state.

In some embodiments, in process block 230, the UE 10 may leave a coverage area associated with the wireless communication network 102 (e.g., of the base stations 104) and/or be located in an area that is not within a coverage area of the wireless communication network 102. In some embodiments, in response to the UE 10 being located in an area that is not within the coverage area of the wireless communication network, the UE 10 may enter the idle state. In some embodiments, the UE 10 may not enter the idle state while being located in an area that is not within a coverage area of the wireless communication network 102. In any such cases, as similarly described in process block 216, in process block 232, the base station 104 transmits a request to send broadcast service information (e.g., a broadcast service message) via the BSS 90 resources provisioned (e.g., previously provisioned) to the UE 10 to the BSS node 108. In addition, as similarly described in process blocks 218 and 220, in process block 234, the BSS node 108 transmits the broadcast service information via the BSS 90 resources provisioned to the UE 10 based on the request, and in process block 236, the UE 10 receives the broadcast service information via the BSS 90. In this manner, the method 200 may enable the UE 10 to utilize the BSS receiver 56 when the UE 10 leaves a coverage area associated with the wireless communication network 102 (e.g., of the base stations 104) and/or be located in an area that is not within a coverage area of the wireless communication network 102. In particular, as discussed herein, even when the UE 10 is out-of-network of the wireless communication network 102, the UE 10 may receive the broadcast service information (e.g., via the BSS node 108, 140). As described above, the broadcast service information may include emergency service notifications, wake-up signals, and/or cellular network access parameters. In addition, in some embodiments, the broadcast service information may be received via a broadcast information channel that the UE 10 may be directed to by a BSS signal 90 (e.g., a pointer signal). As such, the broadcast service network 106 may enable the UE 10 to receive important emergency information, assist in locating a nearby available coverage area of a wireless communication network 102, and/or improve time of search and access to the nearby wireless communication network 102, even when the UE 10 is not located in a coverage area associated with a wireless communication network 102.

Figure 11:
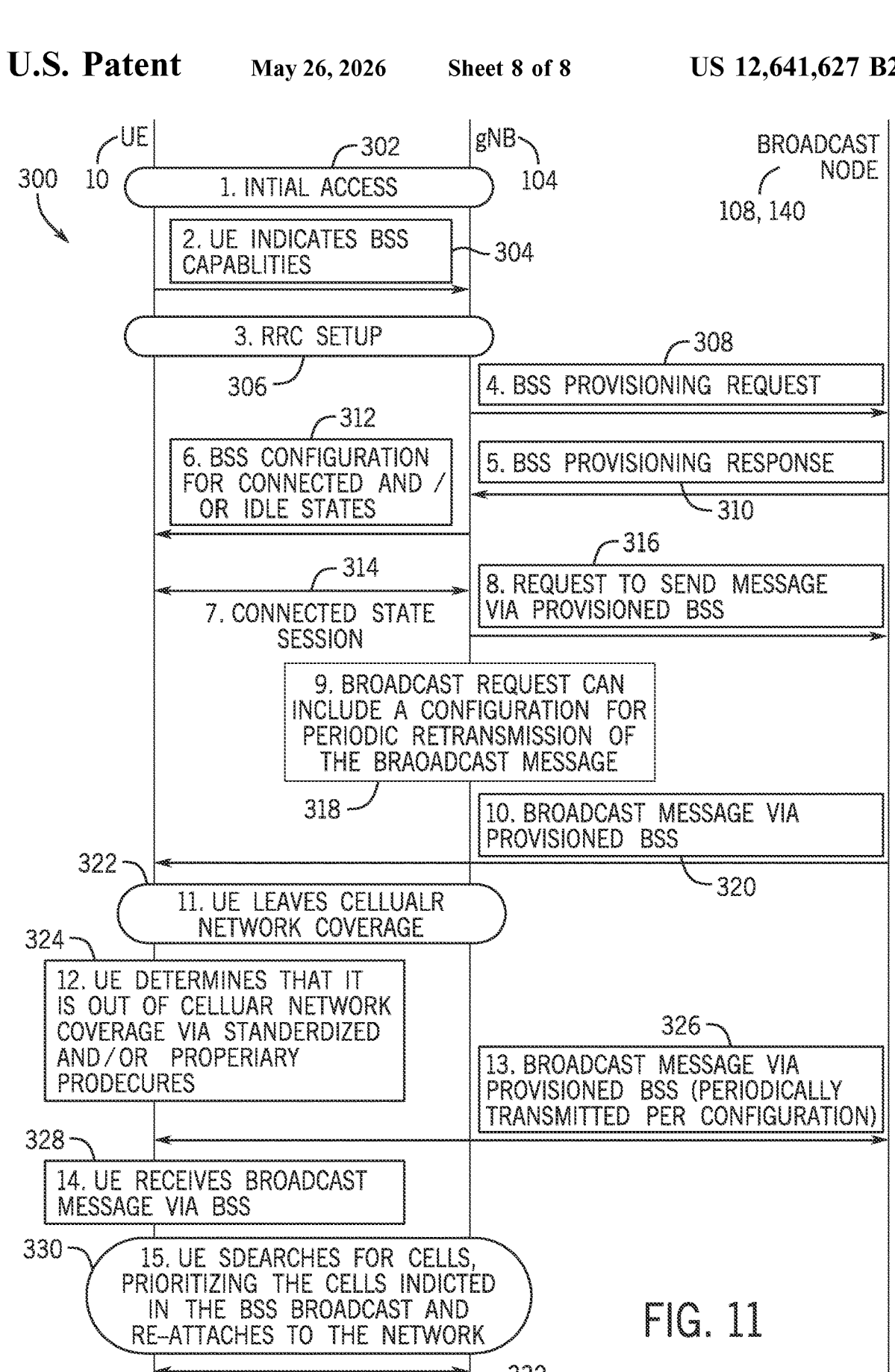
FIG. 11 is a flowchart of a method for utilizing a broadcast signal node of a broadcast service network of FIG. 6 to transmit periodic broadcast service information to the user equipment, according to embodiments of the present disclosure.

FIG. 11 is a flowchart of a method 300 utilizing a BSS node 108, 140 of a broadcast service network 106 to transmit broadcast service information (e.g., wake-up signals, based on pointer signals, emergency service notification, cellular network access parameters, via broadcast information channel, etc.) to UE 10, according to embodiments of the present disclosure. In particular, method 300 enables the UE 10 to return to a connected state session with the wireless communication network 102 based on receiving periodically transmitted broadcast service information. Any suitable device (e.g., a controller) that may control components of the UE 10, the wireless communication network 102 (e.g., cellular network, MBB network), the base stations (e.g., gNBs) 104, the broadcast service network 106, and/or the BSS nodes 108, 140, such as the processor 12, may perform the method 200. In some embodiments, the method 200 may be implemented by executing instructions stored in a tangible, non-transitory, computer-readable medium, such as the memory 14 or storage 16, using the processor 12. For example, the method 200 may be performed at least in part by one or more software components, such as an operating system of the UE 10, the wireless communication network 102, the base stations 104, the broadcast service network 106, and/or the BSS nodes 108, 140, one or more software applications of the UE 10, the network 102, the base stations 104, the broadcast service network 106, and/or the BSS nodes 108, 140, and the like. While the method 200 is described using steps in a specific sequence, it should be understood that the present disclosure contemplates that the described steps may be performed in different sequences than the sequence illustrated, and certain described steps may be skipped or not performed altogether.

Additionally, it should be understood that signal transmissions by the UE 10, the base station 104, and/or the BSS node 108, 140 may be sent by transmitters 52 of the UE 10, the base station 104, and/or the BSS node 108, 140, respectively, and signal receptions by the UE 10, the base station 104, and/or the BSS node 108, 140 may be sent by receivers 54 of the UE 10, the base station 104, and/or the BSS node 108, 140, respectively. Moreover, in some embodiments, the UE 10 may receive at least a portion of the BSS 90, sent by the BSS node 108, 140, by the BSS receiver 56.

Process blocks 302-316 are similar to process blocks 202-216 as described above with reference to the method 200 of FIG. 10. Furthermore, as indicated in process block 318, in some embodiments, the broadcast request may include a configuration (e.g., periodicity configuration, for the BSS node 108, 140) for periodic transmission (e.g., retransmission) of the broadcast service information. For example, in the capabilities of the BSS receiver 56 sent by the UE 10 to the base station 104 as described in process block 204 of FIG. 10, and/or in the BSS receiver provisioning request sent by the base station 104 to the BSS node 108, 140 as described in process block 208 of FIG. 10, the BSS node 108, 140 may receive a configuration of a periodic transmission of the broadcast service information associated with the provisioned BSS 90 (e.g., BSS raster points 184) associated with the UE 10. The configuration may include a periodicity (e.g., every 1 millisecond (ms) or less, every 10 ms or less, every 100 ms or less, every 1 second or less, every 10 seconds or less, every 1 minute or less, every 10 minutes or less, every 10 minutes or more, and so on) to transmit the broadcast service information and/or other parameters of the BSS 90. The configuration may cause the BSS node 108, 140 to broadcast the BSS 90 associated with the broadcast service information. In some embodiments, with the periodicity configuration, the BSS node 108 may initiate broadcasting the BSS 90 itself, as opposed to first receiving a BSS receiver provisioning request signal from the base station 104.

Similarly, as described in process block 218 of FIG. 10, in process block 320, the BSS node 108 transmits the broadcast service information via the BSS 90 resources provisioned to the UE 10 based on the request, and the UE 10 may receive the broadcast service information via the BSS 90. Process block 322 is similar to process block 230 of FIG. 10. In particular, in process block 322, the UE 10 may leave a coverage area associated with the wireless communication network 102 (e.g., of the base stations 104) and/or be located in an area that is not within a coverage area of the wireless communication network 102. In addition, as indicated in process block 324, the UE 10 determines that the UE 10 is out-of-network and/or not within a coverage area associated with the wireless communication network 102 (e.g., not within range of the base station 104). The UE 10 may determine it is not within network via standardized and/or proprietary procedures (e.g., 3GPP procedures, 3G procedures, 4G procedures, LTE procedures, 5G procedures, NR procedures, 6G procedures, etc.). In any case, while the UE 10 is out-of-network, in process block 326, the BSS node 108, 140 transmits the broadcast service information via the BSS 90 resources provisioned to the UE 10 based on the request and according to the periodicity configuration. As similarly described in process block 220 of FIG. 10, in process block 328, the UE 10 receives the broadcast service information via the BSS 90. In addition, the UE 10 may configure the cellular receiver 54 and/or the BSS receiver 56, and/or may display information (e.g., notifications, via display 18) based on the broadcast service information. As discussed herein, the broadcast service information may include emergency service notifications, wake-up signals, and/or cellular network access parameters, and/or the broadcast service information may be received based on pointer signals. In particular, in some embodiments, the broadcast service information may include cellular network access parameters and/or the BSS 90 may be pointer signals to direct the UE 10 to the broadcast information channel 192 to receive the cellular network access parameters. In any case, the cellular network access parameters may be used by the UE 10 to improve time to search and access a wireless communication network 102 that may be available in an area associated with the location of the UE 10 and/or assist the UE 10 in locating a nearby coverage area associated with the wireless communication network 102.

In process block 330, the UE 10 may utilize the cellular network access parameters to search for and access a nearby wireless communication network 102 based on the cellular network access parameters. As discussed herein, the cellular network access parameters may include a band, a channel, and/or a frequency ID associated with nearby base stations 104 (e.g., nearby access to the wireless communication network 102), a coarse timing information and/or a fine timing information of nearby base stations 104 (e.g., to assist UE 10 in finding synchronization signal in timing information), a coarse geographical location information and/or a fine geographical location information of nearby base stations 104, or any combination thereof. In this way, the UE 10 may utilize the cellular network access parameters to perform a targeted search for the band, the channel, and/or the frequency ID associated with the nearby stations 104. In other words, the UE 10 may prioritize searching for and accessing cells (e.g., coverage areas) indicated by the received cellular network access parameters. As such, a time to search and access the wireless communication network 102 may be significantly reduced as compared to a UE 10's time to search and access the wireless communication network 102 that did not receive the cellular network access parameters. Finally, in process block 332, the UE 10 and the base station 104 are in a connected state session (e.g., the UE 10 is communicatively coupled to and configured to receive signals from the base station 104). In particular, in some embodiments, the UE 10 may acquire and/or reacquire a cell 120 of the base station 104 (or another cell 120 of another base station 104 if, for example, the other cell 120 has better signal characteristics (e.g., power and/or quality) or if the UE 10 has moved to another cell 120) using the receiver 54 configured based on the cellular network access parameters. As such, the broadcast service network 106 may enable the UE 10 to receive important emergency information, assist in locating a nearby available coverage area of a wireless communication network 102, and/or improve time of search and access to the nearby wireless communication network 102, even when the UE 10 is not located in a coverage area associated with a wireless communication network 102.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. User equipment, comprising:

transmitter circuitry coupled to one or more antennas;

receiver circuitry coupled to the one or more antennas; and processing circuitry communicatively coupled to the transmitter circuitry and the receiver circuitry, the processing circuitry configured to cause the transmitter circuitry to transmit an indication of a broadcast signal raster density associated with the user equipment, cause the receiver circuitry to receive a broadcast service signal configuration based on the broadcast signal raster density, and cause the receiver circuitry to receive one or more broadcast service signals based on the broadcast service signal configuration.

2. The user equipment of claim 1, wherein the processing circuitry is configured to:

cause the receiver circuitry to receive a radio frequency signal associated with a wireless communication network, the radio frequency signal comprising timing information;

synchronize with the wireless communication network based on the timing information; and cause the transmitter circuitry to transmit a request to establish a radio resource control setup procedure.

3. The user equipment of claim 1, comprising second receiver circuitry coupled to the one or more antennas, wherein the processing circuitry is configured to:

cause the second receiver circuitry to receive a radio frequency signal associated with a wireless communication network, the radio frequency signal comprising timing information;

synchronize with the wireless communication network based on the timing information; and cause the transmitter circuitry to transmit a request to establish a radio resource control setup procedure.

4. The user equipment of claim 3, wherein the radio frequency signal is associated with a first frequency range, and the one or more broadcast service signals are associated with a second frequency range, the second frequency range not overlapping with the first frequency range.

5. The user equipment of claim 3, wherein the processing circuitry is configured to cause the receiver circuitry to receive the one or more broadcast service signals based on coverage of the wireless communication network being lost.

6. The user equipment of claim 1, wherein the one or more broadcast service signals comprise an indication of a frequency band, a channel, a frequency identification, or any combination thereof, provided by a base station associated with a wireless communication network.

7. The user equipment of claim 1, wherein the processing circuitry is configured to locate a coverage area associated with a wireless communication network based on the one or more broadcast service signals.

8. The user equipment of claim 1, wherein the processing circuitry is configured to cause the transmitter circuitry to transmit one or more broadcast service signal capabilities associated with the user equipment, the one or more broadcast service signal capabilities comprising one or more operating characteristics associated with the receiver circuitry operating in a connected state, an idle state, an out-of-network state, an inactive state, or any combination thereof.

9. The user equipment of claim 1, wherein the broadcast service signal configuration comprises a broadcast service signal channel, at least one broadcast service signal raster point, or both, associated with the user equipment.

10. The user equipment of claim 9, wherein the broadcast service signal configuration comprises a time trigger that enables the receiver circuitry to periodically monitor a broadcast service signal frequency band associated with a broadcast service signal network, the broadcast service signal channel, the at least one broadcast service signal raster point, or any combination thereof.

11. The user equipment of claim 1, wherein the one or more broadcast service signals comprise a wake-up signal, a pointer signal, emergency service information, cellular network access parameters, or any combination thereof.

12. A method, comprising:

receiving, at a base station, an indication of a broadcast service signal receiver from user equipment;

transmitting, by the base station, a broadcast service signal receiver provisioning request based on the indication to a broadcast service network;

transmitting, by the base station, a broadcast service signal configuration to the user equipment based on the broadcast service signal receiver provisioning request; and transmitting, by the base station, a request to send broadcast service information via the broadcast service network to the user equipment.

13. The method of claim 12, comprising:

transmitting, by the base station, a radio frequency signal associated with a cellular network supported by the base station to the user equipment;

receiving, by the base station, a request to establish a radio resource control connection from the user equipment; and transmitting, by the base station, data to or receiving, by the base station, data from the user equipment.

14. The method of claim 12, wherein the indication of the broadcast service signal receiver comprises one or more operating capabilities of the broadcast service signal receiver associated with a connected state, an idle state, an out-of-network state, an inactive state, or any combination thereof, associated with the broadcast service signal receiver.

15. The method of claim 12, wherein the broadcast service network is configured to transmit one or more broadcast service signals comprising the broadcast service information based on receiving the request to send the broadcast service information, the one or more broadcast service signals comprising a wake-up signal, a pointer signal, emergency service information, cellular network access parameters, or any combination thereof.

16. The method of claim 12, wherein the broadcast service signal receiver provisioning request comprises an indication of a broadcast service signal frequency band, a broadcast service signal channel, a broadcast service signal raster point, or any combination thereof, associated with a frequency domain location of a broadcast service signal allocated to the user equipment.

17. The method of claim 12, wherein the broadcast service signal configuration comprises a broadcast service signal channel, at least one broadcast service signal raster point, or both, associated with the user equipment.

18. One or more tangible, non-transitory, machine-readable media, storing instructions configured to cause processing circuitry of a broadcast service signal node to:

receive a broadcast service signal provisioning request from a base station for user equipment;

permit resources to the user equipment based on the broadcast service signal provisioning request;

receive a request to transmit broadcast service information to the user equipment; and transmit a broadcast service signal associated with the broadcast service information to the user equipment.

19. The one or more tangible, non-transitory, machine-readable media of claim 18, wherein the broadcast service signal comprises a wake-up signal, a pointer signal, emergency service information, cellular network access parameters, or any combination thereof.

20. The one or more tangible, non-transitory, machine-readable media of claim 18, wherein the broadcast service signal provisioning request comprises an indication of a broadcast service signal frequency band, a broadcast service signal channel, a broadcast service signal raster point, or any combination thereof, associated with a frequency domain location of the broadcast service signal allocated to the user equipment.

* * * * *